Aug. 30, 1949.  E. LAXO  2,480,190
APPARATUS FOR FORMING AND LOCKING
CAN BODY SIDE SEAMS

Filed Dec. 24, 1946  7 Sheets-Sheet 6

INVENTOR
ED LAXO
BY
Mellin and Hanscom
ATTORNEYS

Patented Aug. 30, 1949

2,480,190

UNITED STATES PATENT OFFICE 2,480,190

APPARATUS FOR FORMING AND LOCKING CAN BODY SIDE SEAMS

Ed Laxo, Oakland, Calif., assignor to Atlas Imperial Diesel Engine Co., Oakland, Calif., a corporation of Delaware Application December 24, 1946, Serial No. 718,212

6 Claims. (Cl. 113—12)

The present invention relates to apparatus for producing side seams in can bodies, and more particularly to machines for both forming and locking the side seams in a single operation.

Heretofore, machines for forming and locking side seams of can bodies have included a tool supporting crosshead or block slidable in guides to and from a cooperable tool supporting horn or mandrel. Proper operation of such machines is dependent upon accurate positioning, machining and aligning of the guide surfaces and crosshead, which is difficult to obtain. Following proper adjustment of the parts, the sliding friction between the crosshead and guide develops wear and play, which eventually alters the coordination between the parts to such an extent as to result in the production of improperly formed side seams in the can bodies.

It is, accordingly, an object of the present invention to provide a can body sideseamer and lockseamer apparatus in which the crosshead may be readily adjusted for proper movement and coordination with respect to the horn or mandrel, and which has a relatively long life without developing sufficient wear or play to disturb such adjustment.

A further object of the invention is to provide a crosshead, and mechanism for moving the crosshead, which may be adjusted laterally to position it properly with respect to the tools in the can supporting horn of the machine, and which may be readily adjusted when play does develop to maintain the proper operation of the entire apparatus.

Still a further object of the invention is to provide a compact can body lockseamer capable of being readily assembled and dismantled.

One form which the invention may assume is exemplified in the following description and illustrated by way of example in the accompanying drawings, in which.

The apparatus disclosed in the drawings includes a frame 10 embodying a main vertical column 11 of I-shaped cross-section having an upper forwardly extending arm 12 of like cross-section, from which depends a section 13 having vertically spaced bosses 14, 15, 16 for supporting various shafts of the apparatus, to be later described.

Figures 9, 10, 11, 17:
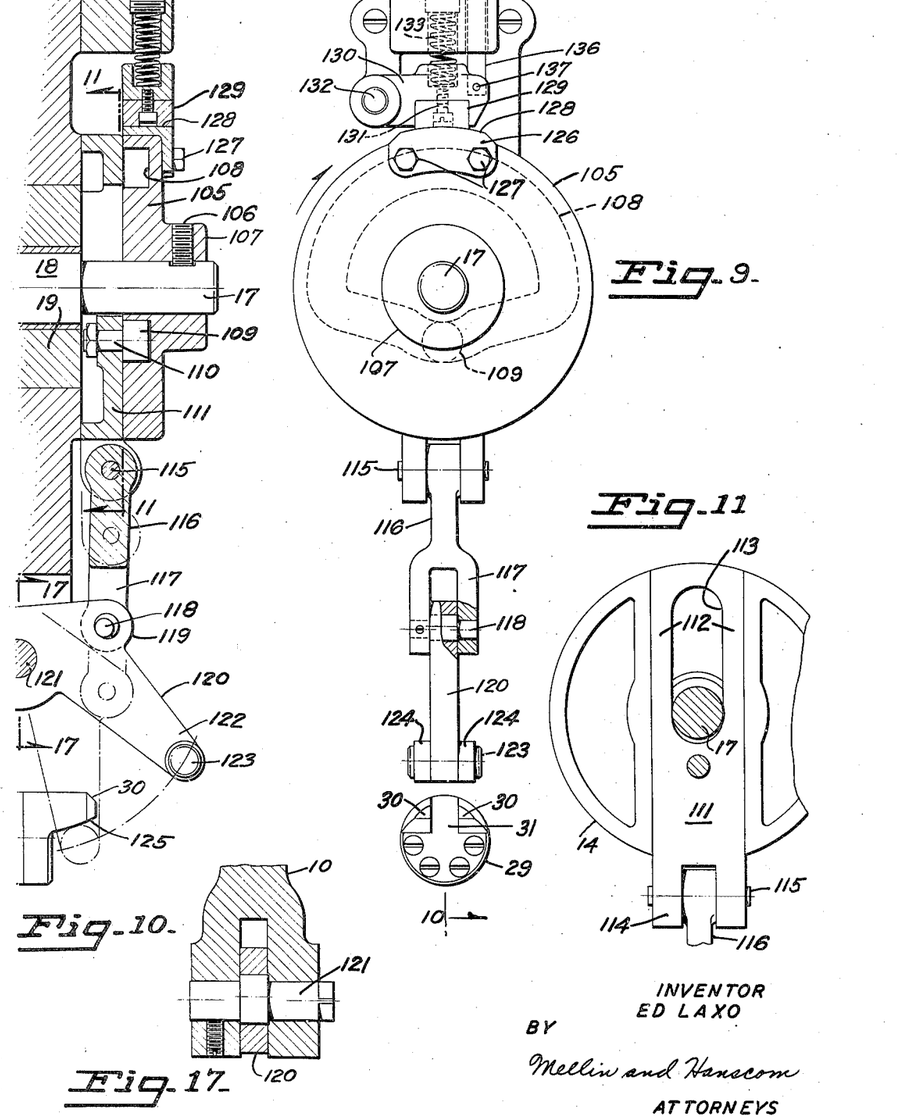
Fig. 9 is an end elevation of the horn or mandrel supporting mechanism and brake, as seen from the right end of Fig. 1.
Fig. 10 is a longitudinal section taken along the line 10—10 on Fig. 9.
Fig. 11 is a partial section taken along the line 11—11 on Fig. 10.
Fig. 17 is a section taken along the line 17—17 on Fig. 10.
Figure 12:
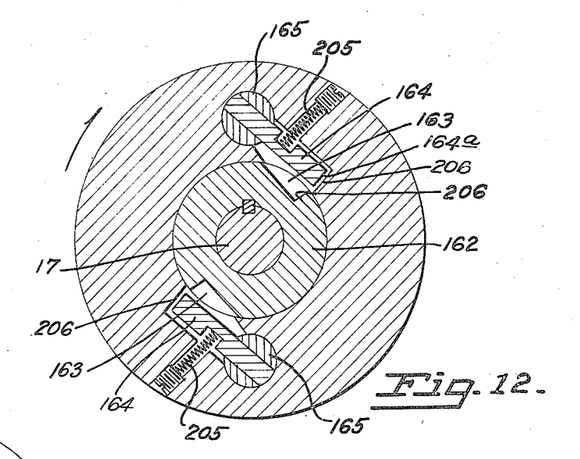
Fig. 12 is a cross-section taken along the line 12—12 on Fig. 8.

A main drive shaft 17 extends completely through the machine, being rotatably supported in a bushing 18 contained within a large cylindrical plug 19 secured in an enlarged boss 14 on the depending frame section 13 (see Fig. 10), and in a similar bushing 20 secured in a large plug or bearing support 21 secured in a large boss 22 in the vertical column 11 of the machine, from which the shaft extends and supports a releasable clutch device 23.

The lower portion of the column 11 also has a boss 24 in which an oscillatable shaft 25 is mounted. This shaft 25 extends forwardly from the column where it is completely surrounded by a horn or mandrel 26 carrying the lower tools of the lockseamer device.

The rearward end of the horn 26 is secured to a flange 27 held within the forward portion of the vertical column 11 by adjustable screws 28 which can be suitably moved to properly align the horn 26 in position with respect to mechanism thereabove.

A cap piece 29 is secured to the forward end of the mandrel, being provided with spaced projecting upper lips or lugs 30 separated by a slot 31.

Figure 1:
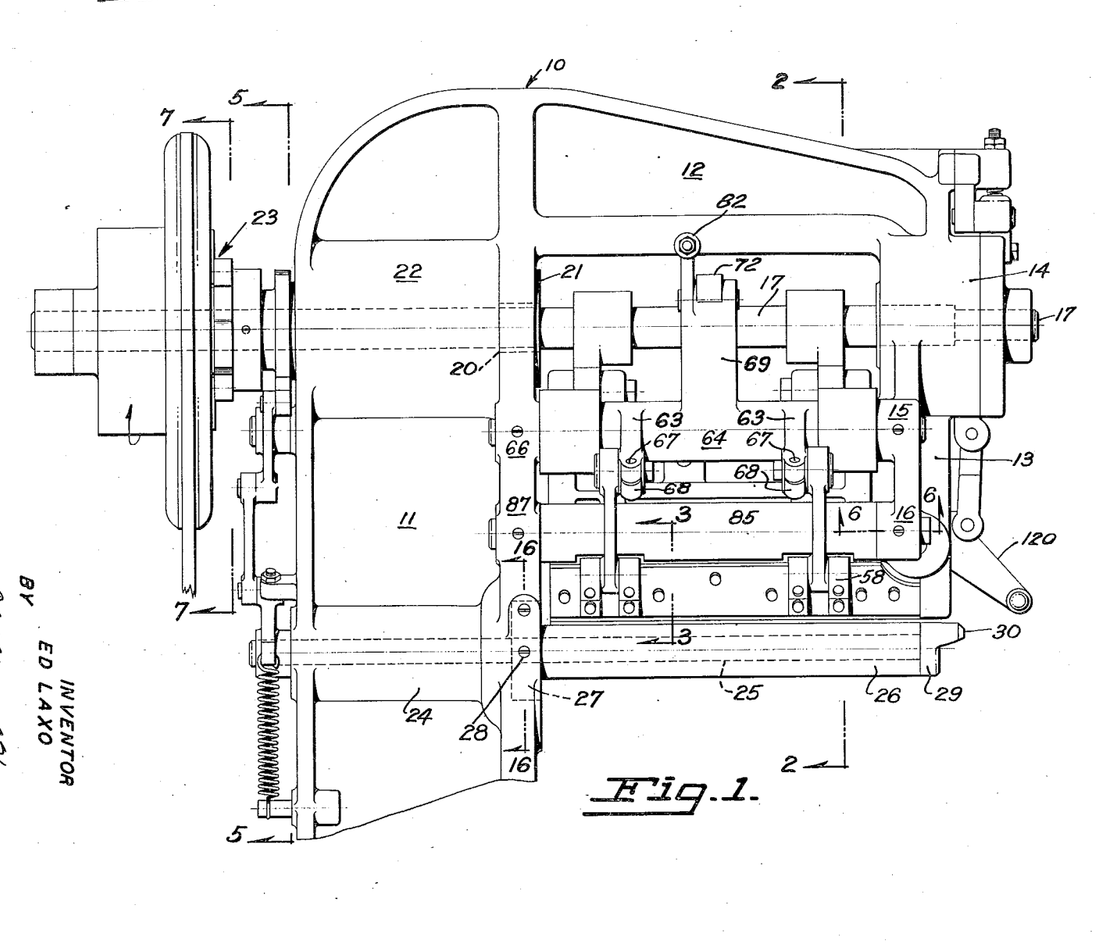
Fig. 1 is a side elevation of a can body lockseamer apparatus.
Figures 2, 3, 4:
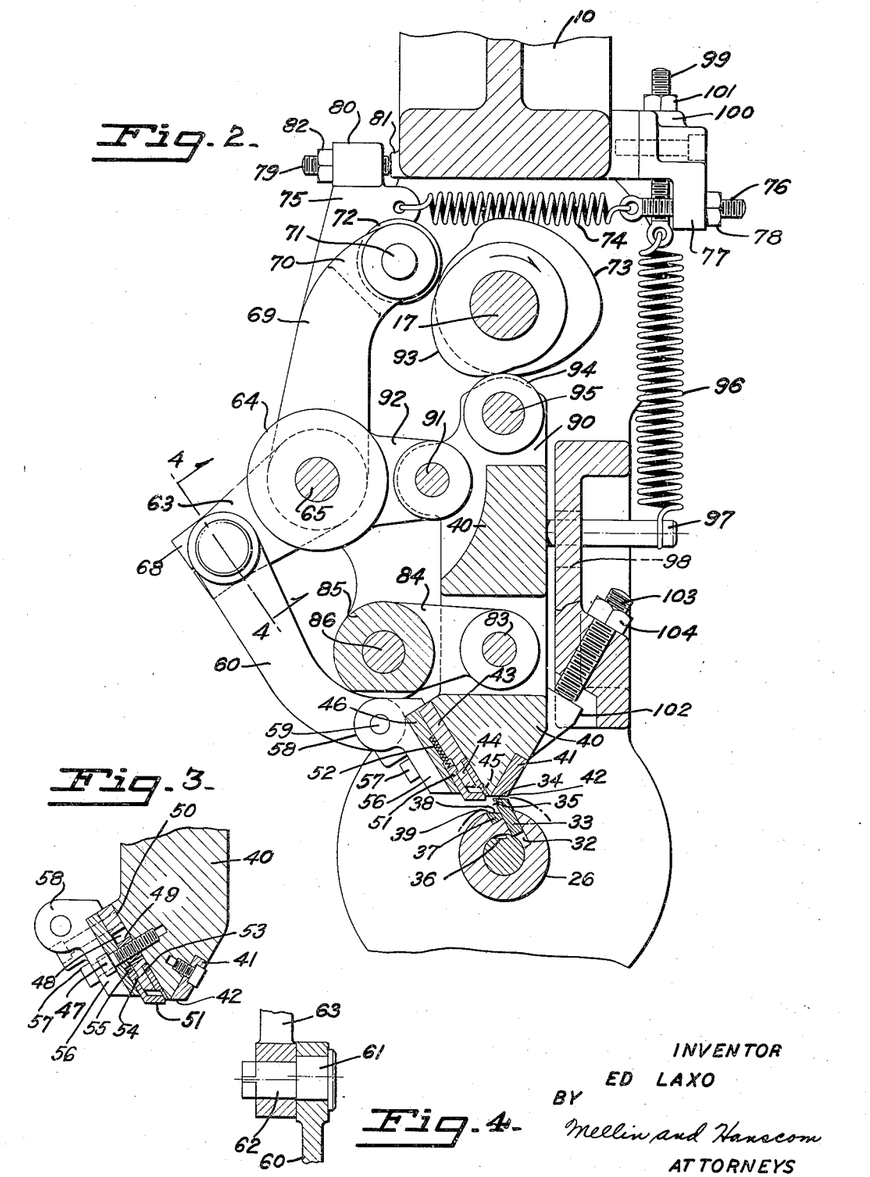
Fig. 2 is a transverse section taken along the line 2—2 on Fig. 1.
Fig. 3 is a cross-section taken along the line 3—3 on Fig. 1.
Fig. 4 is a section taken along the line 4—4 on Fig. 2.
Figure 5:
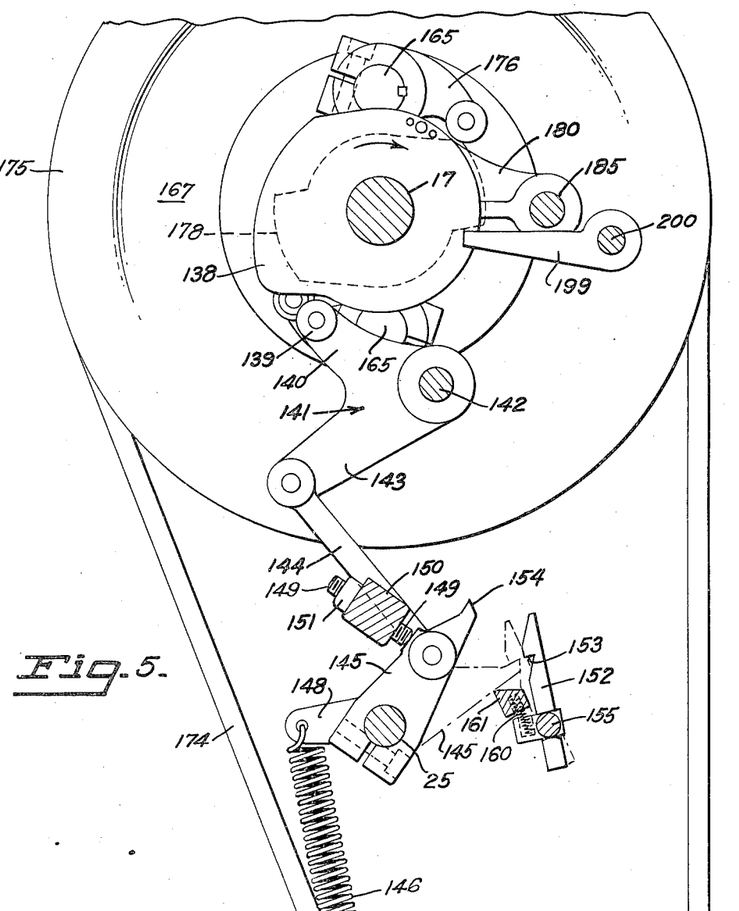
Fig. 5 is a section taken along the line 5—5 on Fig. 1.

The horn or mandrel has a longitudinally extending inclined slot 32 containing an edger tool 33 having an upper face 34 and a side groove 35. This tool is movable between an upper and lower position in the slot 32 in accordance with the position of the oscillatable shaft 25 which has a lengthwise notch or channel 36, which can be retained in an upward position, as disclosed in Fig. 2, holding the edger tool 33 in an upper position, or which may be oscillated in a clockwise direction to bring its notch 36 into conformity with the slot 32 and allow the edger tool 33 to move downwardly. The upper portion of the mandrel 26 also carries a longitudinally extending spline piece 37 adjacent the edger piece 33, which also has an upper face 38 and side groove 39.

The upper tools are supported primarily by a block or crosshead 40 movable upwardly and downwardly to and from the forming tools in the mandrel 26. The lower end of the crosshead carries an inclined bumper steel 41 having a bottom face 42 disposed in a horizontal plane and it also carries a rectangular slidable supporting bar 43 having an outer hook forming tool 44 secured thereto, which terminates in a lower tongue 45 whose bottom face is in alignment with the bottom face of the bumper member 41. A plurality of spaced keeper plates 46 are secured to the lower portion of the crosshead 40 by suitable cap screws 47 extending through slots 48 in the slidable bar and through spacers 49 for threaded reception in the crosshead. These cap screws are tightened to secure the keeper plates 46 to the crosshead 40, the spacers 49 preventing clamping of the supporting bar 43 whose slidability between the keeper plates 46 and the inclined face 50 of the crosshead is unimpaired.

An inner hook-forming tool 51 is carried between the slidable bar 43 and keeper plates 46. This tool is of general L-shape in cross-section, having its short leg disposed horizontally and its long leg slidable to a slight extent along the supporting bar 43. The L-shaped member 51 is urged in a downward direction by a plurality of helical springs 52 whose upper ends engage the keeper plates 46 and whose lower ends engage the long leg of the hook-forming tool, urging the latter downwardly to a position limited by engagement of its lip 53 with a corresponding shoulder 54 formed in the slidable bar 43, the lip being movable within a recess 55 in the bar extending upwardly from its shoulder 54. It is to be noted that the short leg of the hook-forming tool 51 is spaced downwardly a slight distance from the lower end of the slidable bar 43 to allow upward movement of the tool 51 to a limited extent against the force exerted by the springs 52.

The slidable bar 43 is reciprocated by a cam lever and linkage mechanism. Specifically, this mechanism includes a pair of spaced supporting blocks 56 located between the keeper plates 46 and secured to the slidable bar by cap screws 57. Each block has a pair of spaced ears 58 containing a pivot pin 59 on which the lower end of a link 60 is oscillatably mounted between the ears. The upper ends of the links are rotatable on the eccentric portions 61 of pins or studs, whose shaft portions 62 are clamped in the ends of spaced lever arms 63 integral with a common hub 64 rotatable upon a shaft 65 extending between and secured in the intermediate bosses 66, 15 in the vertical column 11 and depending frame section 13. Clamping of each lower lever arm 63 to the shaft portion 62 of the eccentric stud is effected by a screw 67 extending through the ears 68 forming a split extremity of the arm 63.

The lower arms 63 and hub 64 form part of a rocker or bell crank lever having a single upwardly extending arm 69 integral with the hub whose upper portion 70 is bifurcated to support a pin 71 rotatably mounting a cam follower roller 72 adapted to bear against a cooperable cam 73 fixed to the main drive shaft 17. The roller 72 is urged into engagement with the cam 73 by a suitable spring 74, one end of which is secured to a lever arm extension 75 and its other end to an eye bolt 76 extending through a depending frame member 77 and having a nut 78 threaded thereon bearing against the frame member. Inward movement of the upper bell crank lever arm 69 is limited by a headless screw 79 threadedly extending through a lever boss 80 and engaging a pad 81 on the frame 10. The screw 79 is locked in adjusted position by suitable lock nut 82 threaded thereon and engaging the boss 80.

It is apparent that as the drive shaft 17 rotates, the bell crank lever 69, 64, 63 is rocked upon its supporting shaft 65 to move the links 60 and slidable bar 43 downwardly and upwardly with respect to and between the crosshead 40 and its keeper plates 46.

Figure 6:
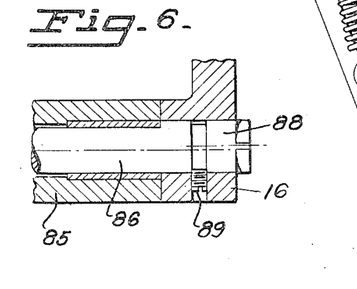
Fig. 6 is a partial longitudinal section taken along the line 6—6 on Fig. 1.
Figure 7:
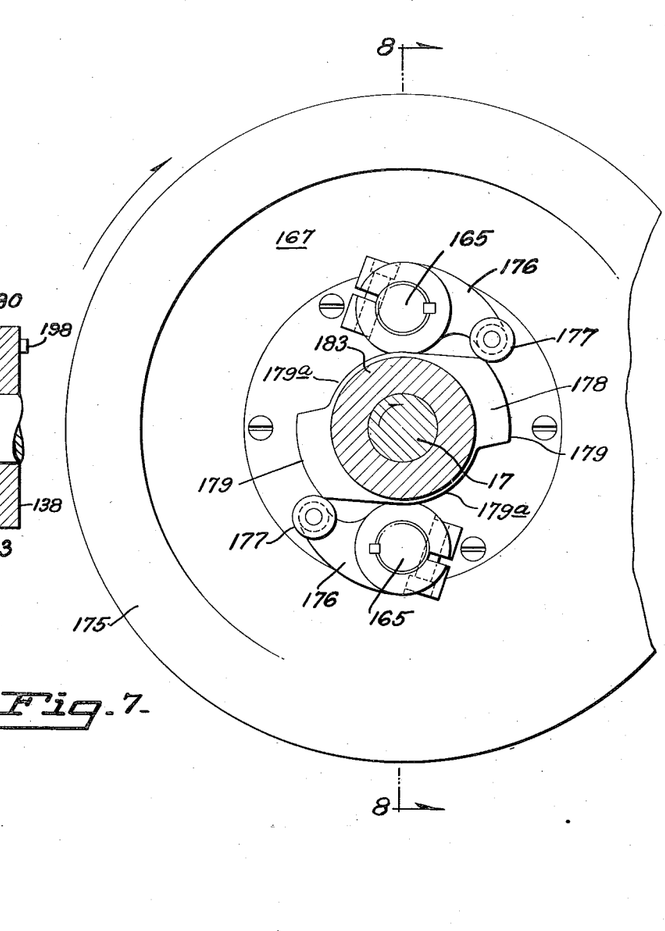
Fig. 7 is a section of the clutch control cam device taken along the line 7—7 on Fig. 1.
Figure 8:
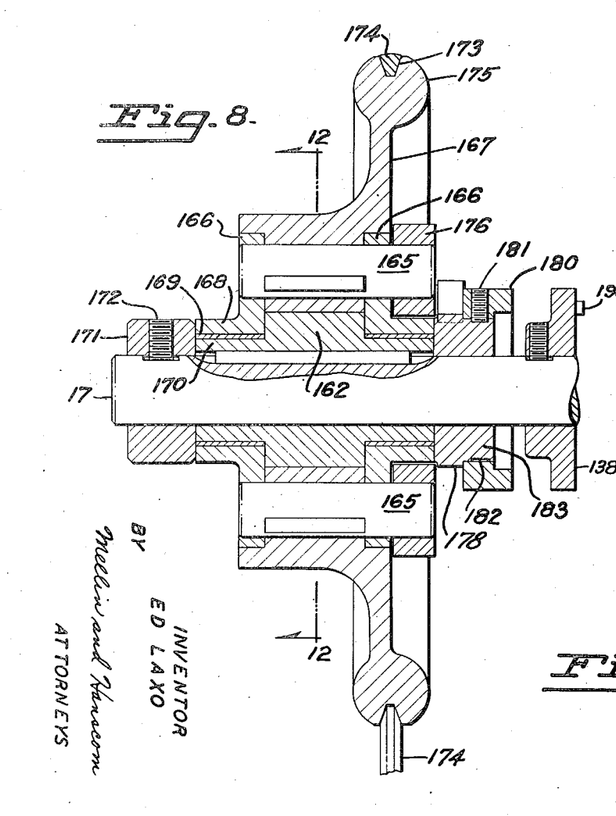
Fig. 8 is a cross-section of the clutch mechanism taken along the line 8—8 on Fig. 7.

The block or crosshead 40 is mounted for movement to and from the forming horn or mandrel 26 of the machine. Spaced pivot pins 83 are secured to the block and on which the inner ends of lower links 84 are oscillatably mounted, their outer ends being secured to a common hub 85 oscillatable about a shaft 86 supported in and extending between the lower bosses 87, 16 in the vertical column 11, and the depending frame section 13. As shown in Fig. 6, the ends 88 of the link supporting shaft 86 are eccentric with respect to the main central portion carrying the hub 85 to allow for adjustment of the oscillatable axis of the outer ends of the links 84. The shaft is turnable in the bosses 16, 87 to appropriate position and are then secured in such position by suitable set screws 89 threaded into the bosses 16, 87 and engaging the shaft ends 88. Upstanding crosshead arms 90 also carry spaced pivot pins 91 on which the inner ends of upper links 92 are oscillatable, their outer ends being rockable upon the outer portions of the intermediate shaft 65 between the ends of the bell crank lever hub 64 and the bosses 15, 66.

The upper and lower links 92, 84 are substantially horizontal and parallel to one another, with the intermediate shaft 65, about which the upper links 92 are oscillatable, being disposed a greater distance outwardly than the lower shaft 86, on which the lower links 84 are oscillatable. The lower links, however, are slightly longer than the upper links, the arrangement, proportion of the parts, and disposition of the pivot points 65, 91, 86, 83 through the links being such that the lower end of the crosshead 40 moves to and from the mandrel 26 in substantially a straight line, rather than arcuately, particularly upon engagement of the crosshead 40 with the sheet metal of a can body C disposed between it and the mandrel.

During part of the downward movement of the crosshead 40, the link 92 moves its upper end in a different transverse direction than the lower link 84 moves its lower end. By referring to Fig. 2, it will be noticed that the axes of shaft 65 and pivot 91 lie in a common horizontal plane when a line through the axes of shafts 86 and pivot 83 is inclined slightly upwardly and inwardly to the horizontal. Accordingly during part of the movement of the crosshead 40, the upper links 92 are moving its upper arms 90 inwardly while the lower links 84 are moving the lower portion of the crosshead 40 outwardly, holding the tools fixed to the crosshead for movement in substantially a straight line.

The crosshead is movable vertically by a pair of cams 93 fixed to the main drive shaft 17 on opposite sides of the bell crank lever operating cam 13. These cams 93 are engaged by cam follower rollers 94 mounted on studs 95 secured in the upper ends of the crosshead arms 90, in order that rotation of the drive shaft 17 and its cams 93 shifts the crosshead 40 toward the tools in the horn 26 and against the can body C, in order to flatten the formed and interlocked hooks on the body C, into a tight and proper side seam. Return movement of the crosshead is obtained by securing the lower end of an extension spring 96 to a pin 97 affixed to the crosshead and extending through a vertical slot 98 in the machine frame 10, the upper end of the spring 96 being suitably attached to an eye bolt 99 threaded through a boss 100 in the frame and supported by a suitable nut 101 threaded on its upper end and engaging the boss. The spring 96 preferably exerts such force as to approximately balance the weight of the crosshead 40 whose upward movement is limited by engagement of its lug 102 with an inclined headless stop screw 103 threaded through the frame 10 of the machine and clamped in adjusted position by a nut 104 mounted on and bearing against the frame.

During the forming and flattening of the can body side seam it is desired to provide support to the free end of the mandrel 26, in order to prevent the production of a defective side seam. Such support is afforded in the present instance by a lever and linkage mechanism controlled and operated from the main drive shaft.

The outer end of the drive shaft 17 has a cam and brake disk 105 secured thereto by means of a cap screw 106 extending through its hub 107 and bearing against the shaft. A cam track 108 is formed in the inner face of the disk, receiving a follower roller 109 rotatably mounted on a pin 110 secured to a yoke 111, slidable vertically between guide surfaces 112 of the machine frame 10. The yoke 111 has a vertical slot 113 through which the drive shaft 17 extends, and depending ears 114 at its lower end supporting a pin 115 on which the upper end of a connecting rod 116 is mounted, whose depending bifurcated arms 117 carry an eccentric pivot pin 118 on which the upper arm 119 of a bell crank lever or rocker 120 is mounted. The bell crank lever 120 is supported on an eccentric stud 121 fixed to the frame 10, the lower arm 122 of the lever being slightly less in width than the distance between the mandrel cap lips 30. A pin 123 projects in opposite directions from the lower end of the arm 122, rotatably mounting rollers 124 engageable under and against the inclined lower faces 125 on the cap lips upon swinging of the lever arm 122 in a downward direction to the position indicated in dotted lines on Fig. 10.

Thus, during rotation of the main drive shaft 17, the disk cam track 108 moves the yoke 111, connecting rod 116 and bell crank lever 120 appropriately to position the rollers 124 under the cap lips 30 and effectively support the mandrel 26 and oscillatable shaft 25 against downward movement, resulting from the force exerted by the forming tools, during the seam forming and flattening operations.

The disk 105 also has a brake segment 126 secured to it by bolts 127, or otherwise, whose peripheral flange 128 extends over the periphery of the disk itself. This brake segment is adapted to engage a brake shoe 129 secured to a brake lever 130, as by a screw 131, mounted on a pivot pin 132 fixed to the frame 10. The braking force of the lever 130 and its shoe 129 against the segment 126 is provided by a spring 133 whose upper and lower ends bear against the frame 10 and brake lever 130, respectively. Downward movement of the brake lever 130 and shoe 129 is limited by engagement of a nut 135 with the upper surface of the frame 10, the nut being threaded on a pin 136 extending freely through the frame and whose lower end is pivoted to the free end of the brake lever 130, as by means of a pin 137.

Oscillation of the shaft 25 within the mandrel 26 is provided in proper sequence during the cycle of operation of the machine by a mechanism now to be described. Movement of the shaft in one direction is effected by a cam 138 fixed to the main drive shaft 17 immediately to the outer side of the vertical frame column 11. This cam is adapted to engage a follower roller 139 mounted on one arm 140 of a rocker lever 141 oscillatable on a pivot pin 142 secured to the frame. The other arm 143 of the lever is pivotally connected to the upper end of a link 144 whose lower end is pivotally connected to a second lever 145 adjustably clamped around and to the end portion of the oscillatable shaft 25 extending from the vertical frame column 11.

Oscillation of the shaft in one direction is performed by the cam 138, rocker lever 141, intermediate link 144 and shaft lever 145. Return movement of the shaft is produced by a spring 146, whose lower end is attached to a pin 147 secured to the column 11 of the machine and whose upper end is secured to a lug 148 projecting from the shaft lever 145. Such return movement is limited by engagement of the lever with a stud 149 threaded into a boss 150 secured to the frame 10 and held in adjusted position by a suitable lock nut 151 on the threaded stud.

Return by the spring 146 of the lever 145 and mandrel shaft 25 to their initial positions is prevented by a releasable lock device consisting of a latch 152 having a notch 153 adapted to engage over the outer nose portion 154 of the shaft lever 145. This latch is secured to a shaft 155 pivotally mounted in a bearing boss 156 in the column 11 of the machine and having a lever 157 secured on its end adapted to engage a collar 158 fixed to an operating rod or link 159, whose lower end is attached to a foot treadle (not shown), by means of which operation of the machine is initiated. The latch 152, its shaft 155 and lever 157 are rocked to lever-latching position by a spring 160 received within a boss 161 secured to the frame 10 and bearing against the flattened portion of the shaft 155 to one side of its axis.

When the operating link 159 is moved downwardly, the spring 160 rocks the latch 152 to engaging position on the lever nose 154. Rotation of the drive shaft 17 and its cam 138 swings the lever 145 downwardly to rotate the shaft 25, placing the lever nose 154 in latching engagement with the latch notch 153, the latch preventing return movement of the lever 145 and shaft 25 by the spring 146. Such return movement occurs upon elevation of the operating rod 159 by a spring (not shown), causing the collar 158 to engage the lever 157 and remove the latch 152 from the lever nose 154, releasing the lever 145 and allowing the spring 146 to function.

The drive shaft 17 may be rotated substantially one complete revolution upon depression of the operating link 159, as determined by a clutch and clutch control mechanism 23 now to be described. The clutch includes an inner driven clutch member 162 keyed on the outer end of the main drive shaft 17 and having a central portion provided with a pair of diametrically opposed recesses or pockets 163 adapted to receive pawl blades 164 attached to trunnion shafts 165 extending through opposed bearing flanges 166 secured to the driving clutch member pulley 167, with their hub portions 168 rotatably mounted on bearing bushings 169 encompassing the end extension portions 170 of the driven clutch member 162. A suitable retainer collar 171 is disposed on the end of the drive shaft, through which a set screw 172 extends into engagement with the shaft 17 to prevent endwise movement of the operating clutch parts.

The driving clutch member 167 is in the form of a pulley having a V-shaped groove 173 in which a V-belt 174 runs, the belt being connected to a suitable prime mover mechanism (not shown) adapted to drive the pulley 167 at the appropriate and desired rate of speed. It is to be noted that the rim 175 of the pulley is shaped in the fashion of a handwheel in order to permit its ready grasping by the operator and turned in either direction, as conditions require.

Each pawl shaft 165 extends outwardly from the inner bearing flange 166 and has a pawl arm 176 keyed thereto extending in the direction of rotation of the pulley. Each arm has a cam follower roller 177 on its free end adapted to engage a cam 178, having diametrically opposed cam lobes 179, which is non-rotatably mounted on the shaft 17 and movable axially thereon by a yoke 180 secured to it by set screws 181 received within a peripheral groove 182 in the cam hub 183 and adapted to be tightened thereagainst, to permit angular adjustment of the cam 178 on the shaft 17 and the obtaining of proper engagement and disengagement of the pawl blades 164 with the driven clutch member 162.

An arm 184 of the yoke is fastened to a slidable clutch control shaft 185, mounted in suitable bearing bosses 186 at the rear of the vertical frame column 11. This shaft 185 and the attached yoke 180 and cam 178 are urged toward the pawl arms 176, to prevent engagement of the clutch, by a return spring 187 encircling the shaft and bearing against one of the shaft bearings 186 and against a collar 188 affixed to the shaft. This collar has a depending lug 189 engaged by a latch lever 190 pivotally mounted on a pin 191 secured to the upper arm 192 of a rocker or bell crank 193 oscillatable on a stud 194 fixed to the machine frame 10. The other arm 195 of the bell crank is pivoted to the upper end of the foot treadle operated rod or link 159. The latch 190 is urged in an upward direction to permit its engagement with the collar lug 189 by a helical spring 196 disposed within a socket 197 in the bell crank lever 193 and bearing against the latch lever 190.

Engagement or disengagement of the latch lever 190 with the collar lug 189 is determined by a pin or cap screw 198 extending from the face of the shaft oscillating cam 138. This cap screw 198 is adapted to engage the end of a trip lever 199 secured to one end of a shaft 200 oscillatable in a boss 201 in the machine frame, the other end of the shaft being attached to another lever 202 whose finger 203 is engageable with a pin 204 on the end of the latch lever 190. The finger 203 extends generally horizontally, as does the latch lever 190, and is of sufficient extent to prevent the pin 204 from moving out of engagement with the finger upon longitudinal movement of the latch lever 190 in response to rocking of the bell crank 193 on its pivot 194.

Figure 13:
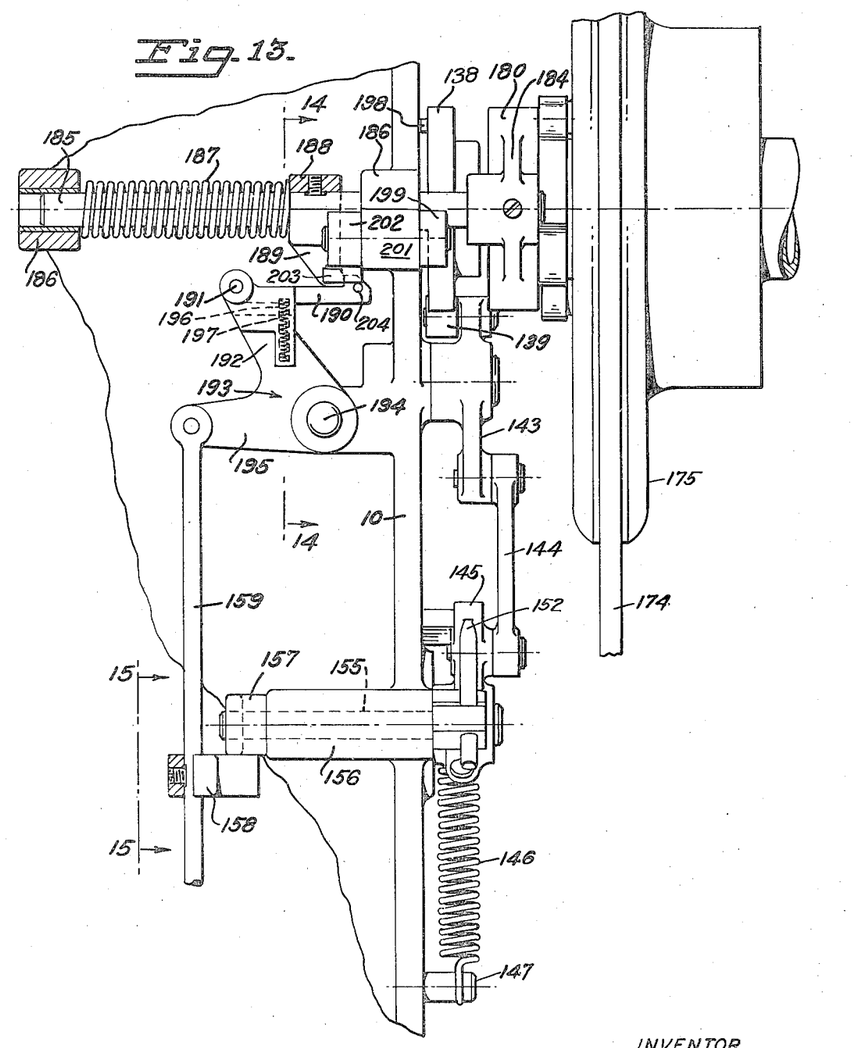
Fig. 13 is a rear side elevation of the control and operating mechanism for the clutch and horn or mandrel oscillatable shaft.
Figures 14, 15, 16:
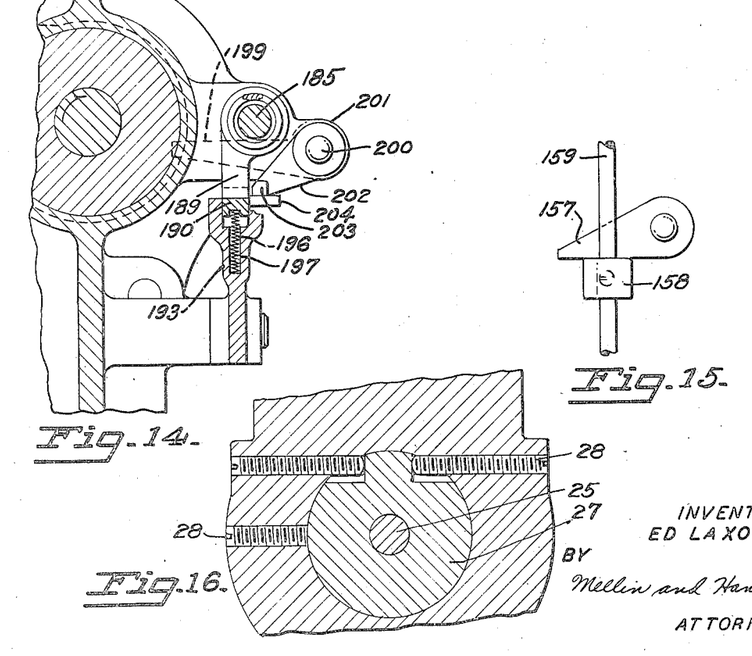
Fig. 14 is a transverse section taken along the line 14—14 on Fig. 13.
Fig. 15 is a partial end view, as seen along the line 15—15 on Fig. 13.
Fig. 16 is a cross-section, taken along the line 16—16 on Fig. 1.

In operating and controlling the clutch, the foot pedal (not shown) is depressed to move the link 159 downwardly, rocking the bell crank 193 on its pivot and moving the latch lever 190 to the left, as seen in Fig. 13, which shifts the slidable clutch shaft 185 to the left against the force of the return spring 187. Such action also carries the yoke 180 and cam 178 to the left, moving the cam 178 out of engagement with the pawl levers and rollers 176, 177 and permitting springs 205 carried by the driving clutch member 167 and engaging the pawl blades 164 to force the latter inwardly into the recesses 163 in the driven clutch member 162 and enabling the pawl ends 164a to engage the transverse faces 206 in the driven clutch member recesses, effecting a driving connection between the driving and driven clutch members. Rotation of the pulley 167 is now transmitted to the driven clutch member 162 and to the main drive shaft 17, causing the machine to undergo its operating cycle.

With a can body C disposed on the mandrel 26 and its adjacent edges positioned between and against the tools 33, 51, the end cam 105 moves its cooperable elements to support the cap end of the mandrel 26, as described above, and the other cam 73, 93, 138 effect sliding of the rectangular bar 43, movement of the crosshead 40 and oscillation of the shaft 25, to form and flatten the can body side seam, all in proper timed relation and in a known manner, the mandrel support 122 then being removed to permit withdrawal of the seamed can body. At the proper time during rotation of the cam 138, its cap screw 198 engages the trip lever 199 to rotate the shaft 200 a partial revolution and move the finger 203 on the other lever 202 down against the pin 204 on the end of the latch 190, shifting the latch downwardly out of engagement with the collar lug 189, which releases the spring 187 and permits it to shift the shaft 185, together with its attached yoke 180 and clutch release cam 178, to the right (as seen in Fig. 13) to a position in which the cam lobes 179 engage the pawl levers 176 and hold the pawls 164 from engaging in the recesses 163 in the driven clutch member 162, thereby freeing the driven clutch member from driving relation with the driving clutch member 167, and allowing the shaft 17 to be stopped upon engagement of the brake segment 126 on the cam track disk 105 with the brake shoe 129.

The automatic release of the clutch occurs at a proper timed sequence depending upon the position of the cap screw 198 in the face of the oscillatable shaft cam 138. The mechanism cannot be operated again unless the foot pedal (not shown) is first released to permit the link 159 to be elevated by a spring (not shown), which moves the latch lever 190 to a position in which it can again engage the face of the collar lug 189. Such elevation of the link 159 also engages the collar 158 with the lever 157 to release the latch 152 from the shaft oscillating lever 145 and allow the spring 146 to return the shaft 25 to its initial position.

It is to be noted that the cam lobes 179 on the clutch releasing cam 178 are so disposed with respect to the ends of the pawl arms 176 and the pawl blades 164 that the pawl arm followers 177 ride up upon the cam lobes 179 to keep the blades from the pockets 163 in the driven clutch member 162, whenever the pawls 164 would otherwise be in position to be moved into such pockets by their springs 205. In between the cam lobes 179, the lower cam surfaces 179a permit inward movement of the pawl arms 176 and blades 164, but in such position the blades are engaging the circular peripheral portions of the driven clutch member 162 between the pockets 163, which is a non-driving position. However, before the blades 164 can move into the pockets 163 with their ends 164a in engagement with the pocket faces 206, the cam follower rollers 177 ride upon the high cam lobes 179 and shift the blades 164 outwardly completely from the pockets.

The entire mechanism may be adjusted very readily. Movement of the rectangular sliding supporting bar 43 may be properly arranged by turning of the eccentric studs 61, 62 mounted in the outer ends of the lever arms 63. Similarly, appropriate disposition of the crosshead 40 may be obtained by appropriately turning the eccentric shaft 86 on which the outer ends of the lower links 84 are mounted. Since the crosshead does not slide in guides or ways, its adjustment can be readily effected in the manner described.

The provision of the enlarged boss 14 on the depending frame section 13, together with the large bearing plug 19, enables the entire shaft 17 to be removed endwise from the frame 10 without dismantling the cams 73, 93 therefrom, with the exception of brake disk 105. Upon the removal of this disk 105 and yoke 111, of the shaft 17, the plug 19, and all of the cams 73, 93 within the machine can be moved endwise as a unit and without disturbing the relative angular positions of the cams 73, 93 upon the shaft 17. However, the clutch mechanism 23 externally of the vertical frame column 11 must be first removed.

The novel features described herein relating to the clutch and clutch control mechanism 23 are both described and claimed in my copending application executed on December 17, 1946, entitled Clutch mechanism, filed December 24, 1946, Serial No. 718,213, while the mechanism for braking the shaft 17 and for supporting the mandrel 26 are both described and claimed in my application executed on December 17, 1946, entitled Mandrel support and brake for can body forming machine, filed December 24, 1946, Serial No. 718,215. Similarly, the mechanism for oscillating the mandrel shaft 25 is described and claimed in my application executed on December 17, 1946, entitled Can body side seam forming apparatus, filed December 24, 1946, Serial No. 718,214, now Patent No. 2,465,239.

While I have described a preferred form of my invention, it is to be understood that various changes may be made therein without departing from the spirit of the invention as defined by the appended claims.

Having thus described my invention, what I claim and desire to secure by Letters Patent is:

1. Apparatus of the character described, including a frame, a can body supporting mandrel secured to said frame, a movable crosshead, upper and lower supporting links having their inner ends pivotally connected to said crosshead, shafts secured to said frame and on which the outer ends of said links are oscillatably mounted, a tool supporting bar slidable in said crosshead, means for reciprocating said bar in said crosshead comprising a lever oscillatably mounted on one of said shafts, and means for moving said crosshead to and from said mandrel to effect formation of a side seam on a can body.

2. Apparatus of the character described, including a frame, a can body supporting mandrel secured to said frame, a movable crosshead, upper and lower supporting links having their inner ends pivotally connected to said crosshead, upper and lower shafts secured to said frame and on which the outer ends of said upper and lower links are oscillatably mounted, respectively, a tool supporting bar in said crosshead, means for reciprocating said bar in said crosshead comprising a lever oscillatably mounted on said upper shaft and a connecting rod secured to said lever and bar, and means for moving said crosshead to and from said mandrel to effect formation of a side seam on a can body.

3. Apparatus of the character described, including a frame, spaced bearing supports in said frame, a can body supporting mandrel carried by said frame, a crosshead, means mounting said crosshead for movement to and from said mandrel to effect formation of a side seam on a can body, a tool supporting bar in said crosshead, a drive shaft rotatably mounted in said bearing supports, means including a cam fixed to said drive shaft for shifting said crosshead toward said mandrel, means including a cam fixed to said drive shaft for sliding said bar in said crosshead, one of said bearing supports being mounted within an opening in said frame whose transverse distance is greater than the transverse distance across said cams, to allow said drive shaft and cams to be removed as a unit through said opening.

4. In a can body side seam forming machine comprising a frame, a mandrel having an edger tool, a crosshead, a hook forming tool carried by and reciprocable in said crosshead, means to reciprocate said hook forming tool in said crosshead, and means for moving said crosshead to and from said mandrel to form can body side seams, the improvement which comprises upper link means and lower link means, each pivotally supported at one end by said frame and pivotally supporting said crosshead at its other end, said pivotal connections being so displaced and the relative lengths of the links being such as to cause the last increment of movement of said crosshead before and during seam formation to be in a straight line perpendicular to the mandrel.

5. A can body side seam forming machine comprising a frame, a mandrel having an edger tool, a crosshead, a hook forming tool carried by and reciprocable in said crosshead, means to reciprocate said hook forming tool in said crosshead, upper and lower parallel guide links pivotally supported at one end by said frame and pivotally supporting said crosshead at other end, said guide links being such as to guide said crosshead in straight line movement perpendicular to said mandrel during its last increment of movement toward the mandrel, and means acting on said crosshead independently of said guide links for actuating said crosshead.

6. A can body side seam forming machine comprising a frame, a mandrel having an edger tool, a crosshead, a hook forming tool carried by and reciprocable in said crosshead, means to reciprocate said hook forming tool in said crosshead, upper and lower parallel guide links pivotally supported at one end by said frame and pivotally supporting said crosshead at other end, said guide links being such as to guide said crosshead in straight line movement perpendicular to said mandrel during its last increment of movement toward the mandrel, a cam acting on said crosshead independently of said guide links for moving the crosshead toward the mandrel and resilient means for moving said crosshead away from the mandrel.

ED LAXO.

REFERENCES CITED

The following references are of record in the file of this patent:

UNITED STATES PATENTS

| Number | Name | Date |
|---|---|---|
| 725,163 | Smith | Apr. 14, 1903 |
| 837,008 | Stewart | Nov. 27, 1906 |
| 1,798,439 | Seaholm | Mar. 31, 1931 |

FOREIGN PATENTS

| Number | Country | Date |
|---|---|---|
| 19,105 | Great Britain | Dec. 2, 1892 |